United States Patent [19]
Reid

[11] 3,955,304
[45] May 11, 1976

[54] FISHING LURE
[76] Inventor: Robert H. Reid, 297 Bowling Green, Costa Mesa, Calif. 92626
[22] Filed: July 28, 1975
[21] Appl. No.: 599,377

[52] U.S. Cl............................... 43/42.28; 43/42.39
[51] Int. Cl.².......................................... A01K 85/00
[58] Field of Search............ 43/42.39, 42.28, 42.05, 43/42.22, 42.48

[56] References Cited
UNITED STATES PATENTS

| 2,254,949 | 9/1941 | Messacar | 43/42.05 |
|---|---|---|---|
| 2,563,282 | 8/1951 | Schenck | 43/42.22 |
| 2,605,577 | 8/1952 | Waugler | 43/42.39 |
| 2,912,783 | 11/1959 | Marks | 43/42.05 |
| 3,037,316 | 6/1962 | DeZeeuw | 43/42.28 |

Primary Examiner—Warner H. Camp
Attorney, Agent, or Firm—Gausewitz, Carr & Rothenberg

[57] ABSTRACT

A fishing lure exhibiting a combined traversing action and spray inducing surfing has a streamlined body with a flat top and a trailing flexible skirt. The body is diamond shaped in one cross-section and has a leader receiving aperture extending longitudinally therethrough. A long cylindrical weight is positioned symmetrically between the body sides and eccentrically between the flat top and leader receiving aperture.

10 Claims, 10 Drawing Figures

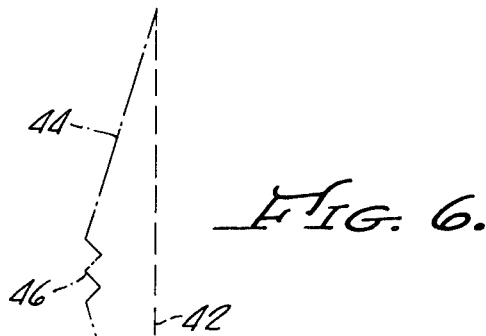
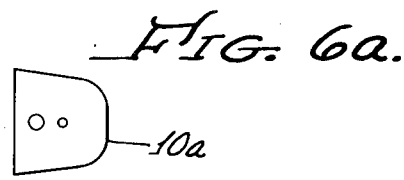
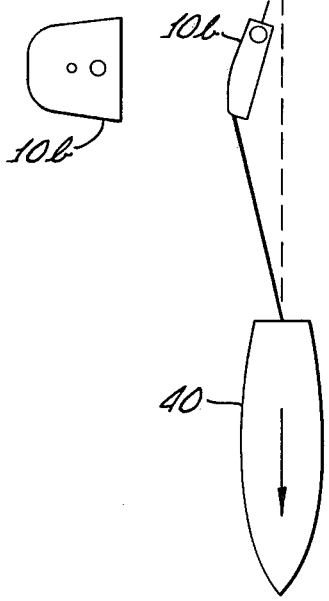
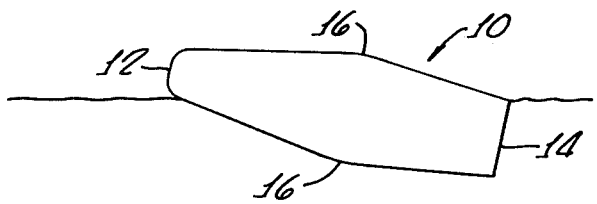
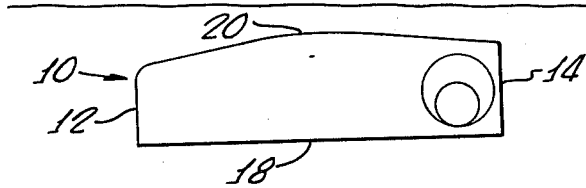

FISHING LURE

BACKGROUND OF THE INVENTION

Lures for large fish such as marlin are towed behind a boat at suitable trolling speeds. Usually running submerged, such lures surface at relatively infrequent intervals and for short periods of time. Certain lures have been made to exhibit a traversing action in which the lure follows a somewhat zig-zag course with respect to the path of travel of the trolling boat. Traversing lures may have their normal forward motion disturbed by provision of a frontal directing surface such as a scoop formed on an otherwise axially symmetrical lure body. Such arrangements significantly increase lure drag.

Some lures have been designed to run below the water even at high trolling speeds. To this end, heavy internal lead weights are applied, surrounding the leader line and often almost filling the lure body. Such a weighted lure, which may be somewhat diamond shaped, runs under the water, has little or no traversing action and provides no spray. Even without a weight, such a lure may run submerged and occasionally will twist up to the surface, again submerging in a type of corkscrew like action. No lure is known to applicant that will provide both a surfing run, which produces substantial spray, and a traversing action having substantial side components induced by other than simple turbulence. Such a combination of lure action is known to attract Pelogic fish (marlin, large tuna, dolphin).

Accordingly, it is an object of the present invention to provide an improved lure that will run well on the surface with substantial traversing action.

SUMMARY OF THE INVENTION

In carrying out principles of the present invention in accordance with a preferred embodiment thereof, an elongated lure body having sides tapering forwardly to form a relatively narrowed nose also has a rounded bottom and substantially flat top. A leader receiving aperture extends through the length of the body and a weight is positioned in the body between the aperture and the top of the body. According to a specific feature of the invention, the weight is provided by a relatively small cylindrical rod disposed centrally between the sides of the body and adjacent the flat top, extending substantially the full length of the body.

BRIEF DESCRIPTION OF THE DRAWINGS

FIG. 6 is a sketch of the path of a trolling boat and a lure drawn thereby, showing lure orientation;

FIGS. 6a and 6b are front elevation views of the lure at different points on the path of FIG. 6;

FIG. 7 is a side elevation view illustrating the planing action of the lure; and FIG. 8 illustrates lure position when submerged during a direction change.

DETAILED DESCRIPTION

Figure 1:
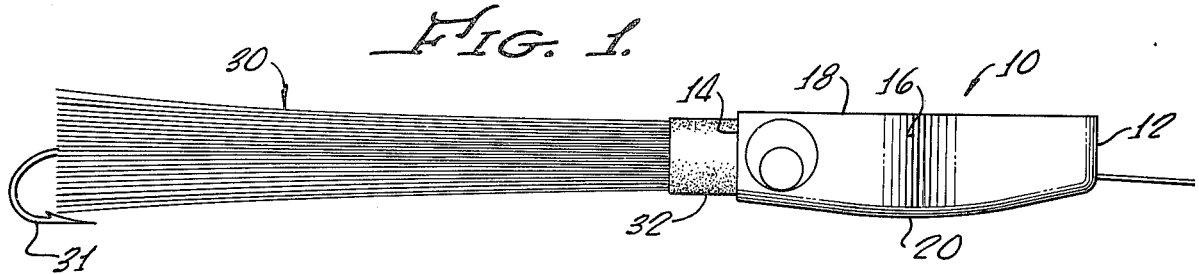
FIG. 1 shows a fishing lure embodying principles of the present invention.
Figure 2:
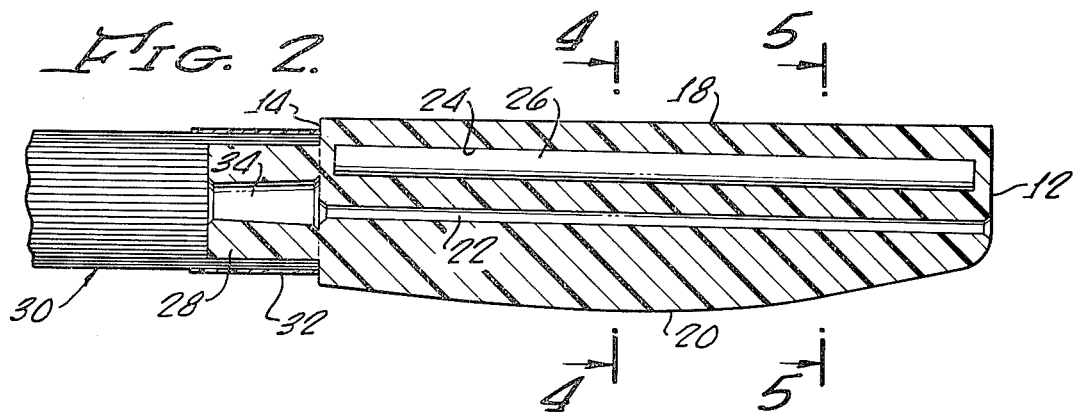
FIG. 2 is a longitudinal sectional view of the lure of FIG. 1.
Figure 3:
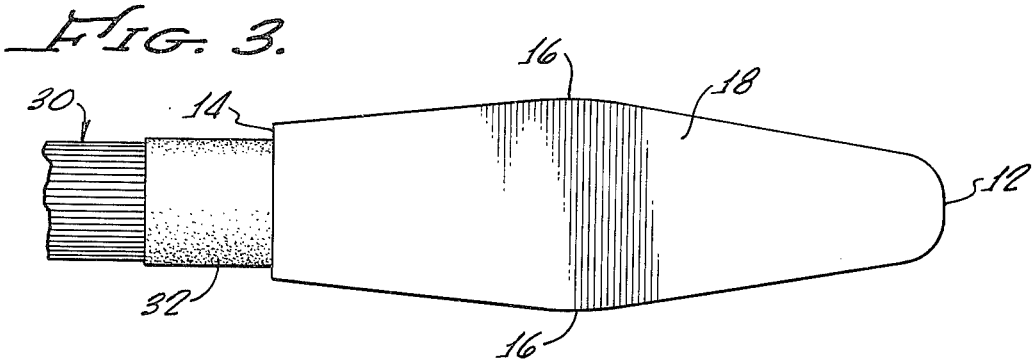
FIG. 3 is a top plan view of the lure of FIG. 1.
Figure 4:
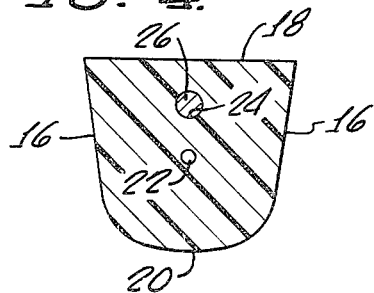
FIGS. 4 and 5 are sections taken on lines 4—4 and 5—5 of FIG. 2.
Figure 5:
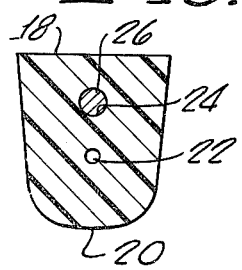

As illustrated in FIGS. 1 through 5, the fishing lure comprises a solid cast streamlined body 10 of a rigid and transparent plastic material such as a polyester casting resin. The material may be suitably colored, retaining some degree of transparency or at least translucency. The body is of generally elongated diamond shape in plan view (FIG. 3), having a length from its nose 12 to a flat rear 14 of approximately 4½ inches, with a maximum width at a point 16 substantially midway of its length of about 1⅜ inches. The body width at the rear is one inch and at the rounded nose ½ inch. It will be understood that these dimensions are exemplary only, and may be varied without departing from principles of this invention.

The lure has a flat top 18 and a rounded inclined bottom 20, having a total maximum height of about 1¼ inches and a height at its nose of about ⅞ inch. The height at the back is about 1⅛ inch. The terms "top" and "bottom" are used solely for purposes of exposition and are not intended to characterize the orientation of the lure during its operation. Particular orientation of the lure, which runs largely on its side, will be described in detail hereinafter.

The relatively high streamlining of the lure, the rounded nose, the rounded bottom, the forward tapering of the sides, and the inclination of the bottom, are all significant in minimizing drag by eliminating cavitation and affording certain hydrodynamic forces which act upon the lure in combination with the weight, to be described below, to provide the desired planing and traversing action.

A leader line receiving aperture 22 extends entirely longitudinally through the body of the lure from a point at the front end adjacent the lure bottom to a point at the rear of the lure that is substantially centrally located. A second aperture 24, which is preferably a blind aperture, is drilled or otherwise formed in the lure body, extending from the rear 14 substantially to, but just short of, the front of the lure. Although aperture 24 could extend completely through the lure, it is preferred to form it as a blind aperture in order to maintain smooth hydrodynamic lines of the lure front. An elongated weight in the form of a cylindrical lead rod 26 is fixedly positioned within the aperture 24 as by being a force fit within the aperture or by use of suitable adhesives or both. Aperture 24 and rod 26 extend substantially parallel to the lead line receiving aperture 22 and are positioned substantially symmetrically between the body sides, as viewed in plan, but eccentrically between the top and bottom. Aperture 24 and weight 26 are positioned closer to the flat top 18, being positioned between this top and the lead line receiving aperture 22.

A relatively smaller diameter extension or button 28 is fixedly secured to the back 14 of the lure body, projecting rearwardly thereof for somewhat less than one inch, and serves for securement of a skirt 30 which is suitably formed of a number of strands of a plastic such as polypropylene or saran fibres, for example. The skirt has its foward ends secured to and about the periphery of extension 28 by means of an encircling thread or tape 32.

Extension 28 is formed with an aperture 34 having a diameter considerably larger than lead line receiving aperture 22 and in communication therewith, at least one of the smaller and larger apertures including a flared connecting section to provide a relatively smooth junction between the two which facilitates insertion of an end of a leader line into the relatively small aperture 22 and prevents chafing of the leader. A hook 31 is attached to the leader line and positioned generally within the skirt 30.

It may be noted that most lures are weighted to cause them to run below the surface. In the design and development of the present lure, a weight was added in an attempt to have the lure run well below the surface and to evaluate it in this mode. However, the weight was added eccentrically and was made of relatively small magnitude as described below. Unexpectedly and surprisingly, the lure did not run submerged when the weight was added, but rather planed, and in addition, exhibited a significant and highly desirable traversing action, which is illustrated in FIG. 6.

As illustrated in FIG. 6, a trolling boat 40, traveling along a path indicated at 42, will draw the lure 10 behind it. The lure follows a traversing path indicated by ziz-zag line 44. A further unexpected and surprising result is the surfing action of the lure.

Traversing action of the lure is significant, with excursions varying from approximately one to as much as eight feet, depending upon the roughness of the prevailing water. Each excursion is measured (in a direction perpendicular to the boat path 42) as the distance between an extreme position at one side of the line of boat travel and an extreme position to the other side of the line of boat travel. Excursions of the above stated magnitude have been observed at trolling speeds of between 8 to 11 knots.

During the traversing action, the lure travels in a planing or surfing position, as best illustrated in FIG. 7, with as much as one-half of the lure out of the water. The amount of submergence of the lure body varies with rolling speed and distance of the lure from the boat or, more specifically, the angle of inclination of the leader. Preferably, the leader is positioned so that the front of the leader is on or out of the water.

In the traversing action, the lure travels a plurality of relatively straight path sections, each inclined to the direction of travel of the boat. It follows one section of this dogleg path until it reaches a point such as indicated at 46 or 48 at which the direction of its traverse changes. During the travel between direction changing points, such as 46 and 48, the lure runs in the planing condition illustrated in FIG. 7 and in the attitude illustrated in FIGS. 6a and 6b. FIG. 6a is a front elevation of the lure 10a of FIG. 6 during its travel from point 46 to point 48. The lure travels not on its top 18 and not its bottom 20, but on its side, with the top initially (as it starts a new leg of its dogleg path) facing outwardly of the path of boat travel. As the lure approaches an end of a leg as illustrated by the position of lure 10a of FIG. 6, it is still traveling on the same side of its body but the lure is now on the other side of the path of boat travel and its top 18, the flat side, is now facing inwardly. As the lure reaches its point of maximum excursion, it momentarily submerges, turning about its roll (longitudinal) axis with its top facing downwardly as illustrated in FIG. 8, and going through a disturbed or wobbling motion for a brief period before it again surfaces. When it surfaces it may be in a position rotated b 180° (about its roll axis) with respect to its prior position.

As the lure planes in its surfing traverse, in the positions illustrated in FIGS. 6 and 7, it throws up a spray which is an additional desirable feature of a lure of this kind. It is believed that the planing action is due to the combination of the lure body streamlining, including the tapered sides and rounded bottom and nose, together with the weight and its position between the lead line aperture and the top or flat surface of the body.

It is found that when the front of the leader is out of the water, and in relatively calm water, the lure will plane a large majority of time, between about 80 and 90% of the time. Even when the lure is positioned far behind the boat and the leader line is in the water, the lure will plane for as much as 50% of the time. Nevertheless, even when submerged, the lure exhibits a traversing action even though of diminished magnitude. When trolled approximately 30 feet behind a boat at approximate 8 to 11 knots, the lure will surf the large majority of the time, particularly when the front of the leader is maintained free of the water.

It is found that the lure described herein has an exceedingly low drag so that it may be readily used with relatively light 20 pound line and outriggers. It provides a traversing action but will not flop or turn end for end, even at high speed and in rough water.

In the exemplary embodiment described herein, the lure including its skirt, but without the leader line and hook, has a total weight of between 131 and 135 grams. The cylindrical weight 26 has a weight of between 10 and 25 grams, preferably approximately 18 to 19 grams. The distance between the lead line receiving aperture and the center of weight 26 is between ¼ and 7/16 inches. It is found that a larger and heavier weight will adversely affect the planing action and the lure does not plane as well. Without any weight at all, little or no planing action has been observed, and the lure runs substantially at the surface at all times. Thus unexpectedly, addition of the weight causes the lure to run on the surface, whereas it runs submerged without the weight. A larger weight causes the lure to exhibit a less desirable traversing action.

Although a circulr cylindrical weight is shown and preferred, at least for ease of manufacture, other weight configurations may be employed to provide the same or equivilent static and dynamic mass distribution of the lure. Thus, non-circular and discontinuous weight elements are also contemplated.

It is noted that in addition to the creation of spray, the surfing action is highly desirable because it greatly reduces the tendency of the lure to pick up floating debris and weeds. The streamlined body and the planing orientation with respect to the surface of the water causes the lure body to slide over and deflect floating weeds which might otherwise become entangled with the lure and seriously degrade its action.

The foregoing detailed description is to be clearly understood as given by way of illustration and example only, the spirit and scope of this invention being limited solely by the appended claims.

What is claimed is:

1. A fishing lure comprising
an elongated lure body having sides tapering forwardly to form a relatively narrowed nose and having a rounded bottom and a substantially flat top, said body having a leader receiving aperture extending through the length thereof; and a weight in said body between said aperture and said body top.

2. The fishing lure of claim 1 wherein said body has an elongated diamond shape that tapers both forwardly and rearwardly from a relatively wide intermediate section and wherein said nose is rounded to eliminate cavitation.

3. The fishing lure of claim 2 wherein said weight extends for substantially the full length of said body.

4. The fishing lure of claim 1 wherein said weight comprises a rod symmetrically positioned between the sides of said body and extending therethrough adjacent said top.

5. A fishing lure comprising an elongated diamond shaped body having a rounded bottom, a rounded nose and a relatively flat top, said body being formed with a leader receiving aperture extending longitudinally therethrough and positioned closer to said bottom than to said top, and a weight in said body between said aperture and said top.

6. The fishing lure of claim 5 wherein said weight comprises an elongated cylinder of relatively heavy material positioned adjacent said top.

7. The fishing lure of claim 6 wherein said weight comprises a metal rod disposed centrally of said body and extending substantially the full length of said body adjacent said top.

8. The fishing lure of claim 7 including an extension on the back of said body projecting rearwardly thereof, said extension having an aperture registering with and of larger diameter than said leader receiving aperture, and a skirt secured to said extension.

9. The fishing lure of claim 6 including a skirt secured to said body, wherein the weight of said lure is approximately 131 to 135 grams and wherein said elongated cylinder has a weight of 10 to 25 grams.

10. The fishing lure of claim 9 wherein said elongated cylinder has a weight of about 18 or 19 grams.

* * * * *

UNITED STATES PATENT AND TRADEMARK OFFICE
CERTIFICATE OF CORRECTION

PATENT NO. : 3,955,304
DATED : May 11, 1976
INVENTOR(S) : Robert H. Reid

It is certified that error appears in the above-identified patent and that said Letters Patent are hereby corrected as shown below.

Col. 3, line 33: change "rolling" to --trolling--.

Col. 3, line 61: delete "b".

Col. 4, line 37: change "circulr" to --circular--.

Signed and Sealed this

Tenth Day of August 1976

[SEAL]

Attest:

RUTH C. MASON
*Attesting Officer*

C. MARSHALL DANN
*Commissioner of Patents and Trademarks*